(12) United States Patent
Filippov et al.

(10) Patent No.: US 11,206,398 B2
(45) Date of Patent: Dec. 21, 2021

(54) DEVICE AND METHOD FOR INTRA-PREDICTION OF A PREDICTION BLOCK OF A VIDEO IMAGE

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/135,246

(22) Filed: Dec. 28, 2020

(65) Prior Publication Data

US 2021/0120237 A1 Apr. 22, 2021

Related U.S. Application Data

(63) Continuation of application No. PCT/RU2018/000430, filed on Jun. 29, 2018.

(51) Int. Cl.
*H04N 19/11* (2014.01)
*H04N 19/105* (2014.01)
(Continued)

(52) U.S. Cl.
CPC .......... *H04N 19/11* (2014.11); *H04N 19/105* (2014.11); *H04N 19/176* (2014.11); *H04N 19/82* (2014.11)

(58) Field of Classification Search
None
See application file for complete search history.

(56) References Cited

U.S. PATENT DOCUMENTS

2012/0147955 A1* 6/2012 Budagavi ............. H04N 19/117
375/240.12
2018/0091825 A1* 3/2018 Zhao ................... H04N 19/159
(Continued)

FOREIGN PATENT DOCUMENTS

CN 110115034 A 8/2019
CN 110115035 A 8/2019
(Continued)

OTHER PUBLICATIONS

Huang, H. et al., "EE2.1: Quadtree plus binary tree structure integration with JEM tools", Joint Video Exploration Team (JVET) of ITU-T SG 16 WP 3 and ISO/IEC JTC 1/SC 29/WG 11, JVET-C0024, 3rd Meeting: Geneva, CH, May 26-Jun. 1, 2016, 5 pages.
(Continued)

*Primary Examiner* — Chikaodili E Anyikire
(74) *Attorney, Agent, or Firm* — Slater Matsil, LLP

(57) ABSTRACT

A device is configured to select a directional intra-prediction mode from a set of directional intra-prediction modes, wherein each directional intra-prediction mode corresponds to a different intra-prediction angle. Further, the device is configured to select a filter from a set of filters based on the selected directional intra-prediction mode. Further, the device is configured to determine, for a given prediction sample of the prediction block, a reference sample from a set of reference samples based on the selected directional intra-prediction mode, and apply the selected filter to the determined reference sample.

20 Claims, 15 Drawing Sheets

(51) Int. Cl.
H04N 19/176 (2014.01)
H04N 19/82 (2014.01)

(56) References Cited

U.S. PATENT DOCUMENTS

| | | | | |
|---|---|---|---|---|
| 2018/0255299 A1* | 9/2018 | Lee | ............... | H04N 19/70 |
| 2019/0158827 A1* | 5/2019 | Sim | ............... | H04N 19/176 |
| 2020/0051288 A1* | 2/2020 | Lim | ............... | G06T 9/004 |

FOREIGN PATENT DOCUMENTS

| | | |
|---|---|---|
| CN | 110115036 A | 8/2019 |
| WO | 2013073328 A1 | 5/2013 |
| WO | 2018067714 A1 | 4/2018 |
| WO | 2018117891 A1 | 6/2018 |

OTHER PUBLICATIONS

Sullivan, G.J. et al., "Overview of the High Efficiency Video Coding (HEVC) Standard", IEEE Transactions on Circuits and Systems for Video Technology, vol. 22, No. 12, Dec. 2012, pp. 1649-1668.

Seregin, V. et al., "Variable number of intra modes", Joint Video Exploration Team (JVET) of ITU-T SG 16 WP 3 and ISO/IEC JTC 1/SC 29/WG 11, JVET-D0113r2, 4th Meeting: Chengdu, CN, Oct. 15-21, 2016, 2 pages.

ITU-T, H.262 Amendment 4 (Feb. 2012), Series H: Audiovisual and Multimedia Systems, Infrastructure of audiovisual services—Coding of moving video; Information technology—Generic coding of moving pictures and associated audio information: Video: "Frame packing arrangement signalling for 3D content", 238 pages.

ITU-T, H.263 Implementors' Guide (Aug. 5, 2005), Series H: Audiovisual and Multimedia Systems; Coding of moving video. Implementors Guide for H.263: "Video coding for low bit rate communication", 10 pages.

ITU-T, H.264 (Apr. 2017), Series H: Audiovisual and Multimedia Systems, Infrastructure of audiovisual services—Coding of moving video; "Advanced video coding for generic audiovisual services", 812 pages.

ITU-T, H.265 (Feb. 2018), Series H: Audiovisual and Multimedia Systems, Infrastructure of audiovisual services—Coding of moving video; "High efficiency video coding", 692 pages.

* cited by examiner (a)

(b)

DEVICE AND METHOD FOR INTRA-PREDICTION OF A PREDICTION BLOCK OF A VIDEO IMAGE

CROSS-REFERENCE TO RELATED APPLICATIONS

This application is a continuation of International Application No. PCT/RU2018/000430, filed on Jun. 29, 2018, the disclosure of which is hereby incorporated by reference in its entirety.

TECHNICAL FIELD

Embodiments of the present invention relate to the field of picture processing, for example still picture/image and/or video picture/image coding. In particular, embodiments relate to a device for intra-prediction, namely for intra-predicting a prediction block of a video image. The device may be or be part of a video image encoder or a video image decoder. The device is particularly configured to perform directional intra-prediction of the prediction block. Embodiments also relate also to a corresponding intra-prediction method.

BACKGROUND

Video coding (video encoding and decoding) is used in a wide range of digital video applications, for example, broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g., scalability and/or three-dimensional (3D) extensions, of these standards.

Video compression is able to achieve the desired bitrate reduction, but is a complex task. In particular, video compression is constrained by two contradicting parameters: compression efficiency and computational complexity. Video coding standards, such as ITU-T H.264/AVC or ITU-T H.265/HEVC, provide a good tradeoff between these parameters. For that reason, support of video coding standards is a mandatory requirement for almost any video compression application.

The state-of-the-art video coding standards are based on partitioning of a source picture into blocks. Processing of these blocks depend on their size, spatial position and a coding mode specified by an encoder.

Coding modes can be classified into two groups according to the type of prediction: intra- and inter-prediction modes. Intra-prediction modes use pixels of the same picture to generate reference samples to calculate the prediction values for the pixels of the block being reconstructed. Intra-prediction is also referred to as spatial prediction. Inter-prediction modes are designed for temporal prediction, and use reference samples of previous or next pictures to predict pixels of the block of the current picture.

After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., Coding Units (CUs). Each of the CUs can be further split into either smaller CUs or Prediction Units (PUs). A PU can be intra- or inter-predicted according to the type of processing applied for the pixels of the PU. In case of inter-prediction, a PU represents an area of pixels that is processed by motion compensation using a motion vector specified for a PU. For intra-prediction, the adjacent pixels of neighbor blocks are used as reference sample to predict a current block.

A PU specifies a prediction mode that is selected from the set of intra-prediction modes for all the Transform Units (TUs) contained in this PU. That is, the intra-prediction mode is the same for each TU of the PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as DBF, SAO and ALF try to suppress. The use of sophisticated prediction coding (such as motion compensation and intra-prediction) and partitioning techniques (e.g., Quad-Tree (QT) for CUs and PUs as well as Residual Quad-Tree (RQT) for TUs in the HEVC/H.265 standard and Quad-Tree and Binary Tree (QTBT) for the Joint Exploration Model (JEM) reference software starting from version JEM-3.0) allowed the standardization committee to significantly reduce the redundancy in PUs. The fundamental difference between the QT and QTBT partitioning mechanisms is that the latter one enables not only square but also rectangular blocks by using partitioning based on both quad- and binary tree. The present invention relates to directional intra-prediction and introduces new modification of directional intra-prediction modes.

According to the HEVC/H.265 standard, 35 intra-prediction modes are available. As shown in FIG. 8 this set contains the following modes:

Planar mode (the intra-prediction mode index is 0),
DC mode (the intra-prediction mode index is 1),
Directional modes (the range of the intra-prediction mode index values is from 2 to 34) shown by solid arrows in FIG. 8. The set of directional intra-prediction modes was extended up to 65 modes (i.e. almost doubled) by decreasing an angular step between directional intra-prediction modes by a factor of 2. These additional modes are shown by the dashed arrows in FIG. 8.

For the JEM-3.0 software, the new partitioning mechanism known as QTBT was proposed. As depicted in FIG. 9, QTBT partitioning can provide not just square but rectangular blocks. Of course, some signaling overhead and increased computational complexity at the encoder side are the price of the QTBT partitioning, as compared to conventional QT based partitioning used e.g., in the HEVC/H.265 standard. Nevertheless, the QTBT-based partitioning is endowed with better segmentation properties and, hence, demonstrates significantly higher coding efficiency than the conventional QT.

However, when introducing QTBT the set of available directional intra-prediction modes was not changed accordingly. In particular, asymmetry of rectangular blocks was not taken into account, as shown in FIG. 10. Thus, the same number of reference samples are used along both the shorter and the longer sides of rectangular blocks. In the current implementation of the QTBT framework, the number of directional intra-prediction modes depends on neither aspect ratio of blocks, nor on the actual availability of reference samples. As a result, there are highly improbable reference samples used for the shorter side of the rectangular block, while there are probable reference samples that are not used for the longer side.

Notably, as shown in FIG. 11, in this document, the terms of "vertically oriented block" ("vertical orientation of a block") and "horizontally oriented block" ("horizontal orientation of a block") are applied to rectangular blocks generated by the QTBT framework. FIG. 11 shows particularly (a) a horizontally oriented block, and (b) a vertically oriented block.

In the contribution JVET-D0113, it was further proposed to apply a mechanism, wherein the number of directional intra-prediction modes is adjustable. In particular, it was proposed to further increase the number of directional intra-prediction modes to 131 for large blocks sizes, while reducing the number of directional intra-prediction modes for small block sizes. The switching of the number of directional intra-prediction modes based on block sizes is controlled by two threshold values, which are signaled in SPS as log 2 values minus 4 and minus 6, respectively. The first threshold indicates the largest block size that can have 35 intra-prediction mode directions, and the second threshold indicates the largest block size that has 67 intra-prediction mode directions, all other blocks use 131 intra-prediction mode directions. In the default setting, thresholds are signaled as 4 and 6, respectively, and for higher resolution pictures it is set to 5 and 8.

In the implementation, a directional intra-prediction mode index is always represented by a 131 mode range regardless of the number of directional intra-prediction modes actually used. For 67 intra-prediction modes being actually used, only every second angular (directional) mode is allowed, and for 35 modes, only every fourth angular (directional) mode is allowed. Therefore, during intra-prediction mode signaling, an intra-prediction mode of a neighboring block may need to be rounded towards the nearest, second, or fourth angular intra-prediction mode, if the current block uses smaller than 131 intra-prediction mode directions, as is explained in FIG. 12. This conversion is done by applying right and left shifts of 1 or 2 to an intra-prediction mode. If the mode is not MPM, the mode signaling is following the same process as in JEM-3.0, but with a different number of intra-prediction modes. Planar and DC modes are kept unchanged, and do not require mode conversion. To accommodate the increased number of intra-prediction modes, 4-tap intra filters are extended from $\frac{1}{32}$ to $\frac{1}{64}$ fractional pel.

Further, a technology was proposed recently to address the problem of how many directional intra-prediction modes should be included into an intra-prediction mode set for a rectangular block. As shown in FIG. 13, according to the proposed technology, the set of directional intra-prediction modes can be extended subject to the aspect ratio of a prediction block, and can be signaled by mapping the added directional intra-prediction modes to the conventional subset.

FIG. 14 illustrates in this respect a case of an intra-prediction in a diagonal direction with an angle equal to 45° associated with a directional intra-prediction mode. Corresponding HEVC intra mode indexes for this case are 2 (from bottom-left) and 35 (from upper-right).

However, if a similar intra-prediction mechanism is applied to angles smaller than 45°, i.e. for the extended directional intra-prediction modes, the situation is as shown in FIG. 15. Namely, when an intra-prediction direction is specified to be acute (i.e. less than 45°) apparent discontinuities can be observed in the prediction. The source of these discontinuities is particularly that the difference between reference samples positions between two adjacent rows of prediction samples may become larger than one reference sample. This problem relates to methods of reference samples processing and performing intra-prediction interpolation.

SUMMARY

In view of the above-mentioned implementations, the present invention aims to further improve hybrid video coding. In particular, the invention has the objective to provide a device and method for an improved intra-prediction of a prediction block of a video image. The invention particularly aims for additional coding gain without adding hardware and computational complexity. Specifically, the invention intends to overcome the above-described issue that occurs at acute angles of less than 45°, i.e. it wants to suppress discontinuities at these acute angles. The invention should be easily implemented in codecs that use conventional directional intra-prediction mechanisms.

The objective of the present invention is solved according to embodiments of the invention defined by the features of the independent claims. Further advantageous implementations of the embodiments are defined by the features of the dependent claims.

In particular, the invention proposes reducing the discontinuities by changing angular steps (step angles) between neighboring angles of directional intra-prediction modes in at least a subset of the directional intra-prediction modes, e.g., for intra-prediction modes associated with acute intra-prediction angles. This solution is applicable mainly to rectangular blocks produced by such partitioning frameworks as QTBT and MTT.

A first aspect of the invention provides a device for intra-predicting a prediction block of a video image, the device being configured to select a directional intra-prediction mode from a set of directional intra-prediction modes, wherein each directional intra-prediction mode corresponds to a different intra-prediction angle, determine, for a given prediction sample of the prediction block, a reference sample from a set of reference samples based on the selected directional intra-prediction mode, and apply a filter to the determined reference sample, wherein, within a subset of the directional intra-prediction modes, an angular step between the directional intra-prediction modes is defined in dependence of a filter length of the filter.

The device according to the first aspect provides the following advantages:

Additional coding gain can be reached.

It can be used in many potential applications in hybrid video coding paradigms that are compatible with the HM software and the VPX video codec family as well as the JEM and VTM software and the VPX/AV1 video codec family that are a state-of-the-art and a next-generation video coding frameworks, respectively.

Hardware and computational complexities are kept low.

The device can be easily implemented in such codecs that use conventional directional intra-prediction mechanisms.

By defining the angular step based on the filter length of the applied filter, particularly by selecting a smaller angular step for a shorter filter length, the angles associated with the different directional intra-prediction modes in the subset span in total a smaller angular range. Thus, it can be ensured that even for the most acute intra-prediction angle, discontinuities are suppressed due to the filter.

Notably, the prediction block may be a TU or a PU. The device is configured to process, as described for the given prediction sample, each prediction sample in the prediction block. Thus, the device is configured to perform intra-prediction of the entire prediction block in the video image. A sample is an intersection of a channel and a pixel in the video image. For instance, each pixel of the video image may include three samples for Red, Green and Blue.

In an implementation form of the first aspect, the angular step is larger for a larger filter length of the filer and smaller for a smaller filter length of the filter.

For a larger filter length, more acute intra-prediction angles can be used for improving the intra-prediction results, without causing discontinuities. The angles associated with the directional intra-prediction modes in the subset can span in total a larger angular range.

In a further implementation form of the first aspect, the angular step is between 2-4 degrees, particularly is 2, 2.5, 3 or 4 degrees, depending on the filter length of the filter.

In a further implementation form of the first aspect, the angular step is denoted $\Delta\alpha$ and is defined by $$\Delta\alpha = \frac{\arctan N_f}{\Delta M_0}$$

wherein $N_f$ is the filter length of the filter and $\Delta M_0$ is the number of directional intra-prediction modes in the subset.

In this way, the angular step is optimally defined based on the filter length to obtain the best results. Notably, the number of directional intra-prediction modes in the subset may depend, for instance, on the aspect ratio of the prediction block. That is, the subset of directional intra-prediction modes is selected based on the aspect ratio of the prediction block.

In a further implementation form of the first aspect, the filter length of the filter is selected in dependence of the aspect ratio of the prediction block.

For instance, the larger the aspect ratio, the more acute the intra-prediction angles may become at the longer side of the rectangular block. Accordingly, a larger filter length may be required. The larger the filter length, the larger also the angular step in the subset.

In a further implementation form of the first aspect, the filter length of the filter is selected in dependence of a height and/or a width of the prediction block.

In a further implementation form of the first aspect, the filter performs a smoothing over the determined reference sample and one or more adjacent reference samples according to the filter length, when applied to the determined reference sample.

In a further implementation form of the first aspect, the reference samples of the set of reference samples are arranged in a row of the video image adjacently above and above-right the prediction block, and/or are arranged in a column of the video image adjacently left and left-under the prediction block.

In a further implementation form of the first aspect, the device is configured for encoding and/or decoding the video image, or the device is a video encoder and/or video decoder.

For instance, the device of the first aspect can be included in or be an intra-prediction unit of an encoder or decoder.

A second aspect of the invention provides for intra-predicting a prediction block of a video image, the method comprising: selecting a directional intra-prediction mode from a set of directional intra-prediction modes, wherein each directional intra-prediction mode corresponds to a different intra-prediction angle, determining, for a given prediction sample of the prediction block, a reference sample from a set of reference samples based on the selected directional intra-prediction mode, and applying a filter to the determined reference sample, wherein, within a subset of the directional intra-prediction modes, an angular step between the directional intra-prediction modes is defined in dependence of a filter length of the filter.

In an implementation form of the second aspect, the angular step is larger for a larger filter length of the filer and smaller for a smaller filter length of the filter.

In a further implementation form of the second aspect, the angular step is between 2-4 degrees, particularly is 2, 2.5, 3 or 4 degrees, depending on the filter length of the filter.

In a further implementation form of the second aspect, the angular step is denoted $\Delta\alpha$ and is defined by $$\Delta\alpha = \frac{\arctan N_f}{\Delta M_0}$$

wherein $N_f$ is the filter length of the filter and $\Delta M_0$ is the number of directional intra-prediction modes in the subset.

In a further implementation form of the second aspect, the filter length of the filter is selected in dependence of the aspect ratio of the prediction block.

In a further implementation form of the second aspect, the filter length of the filter is selected in dependence of a height and/or a width of the prediction block.

In a further implementation form of the second aspect, the filter performs a smoothing over the determined reference sample and one or more adjacent reference samples according to the filter length, when applied to the determined reference sample.

In a further implementation form of the second aspect, the reference samples of the set of reference samples are arranged in a row of the video image adjacently above and above-right the prediction block, and/or are arranged in a column of the video image adjacently left and left-under the prediction block.

In a further implementation form of the second aspect, the method is for encoding and/or decoding the video image, or the method is performed by a video encoder and/or video decoder.

The method of the second aspect and its implementation forms achieve the same advantages and effects described above for the device of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

DETAILED DESCRIPTION OF ILLUSTRATIVE EMBODIMENTS

Figure 1:
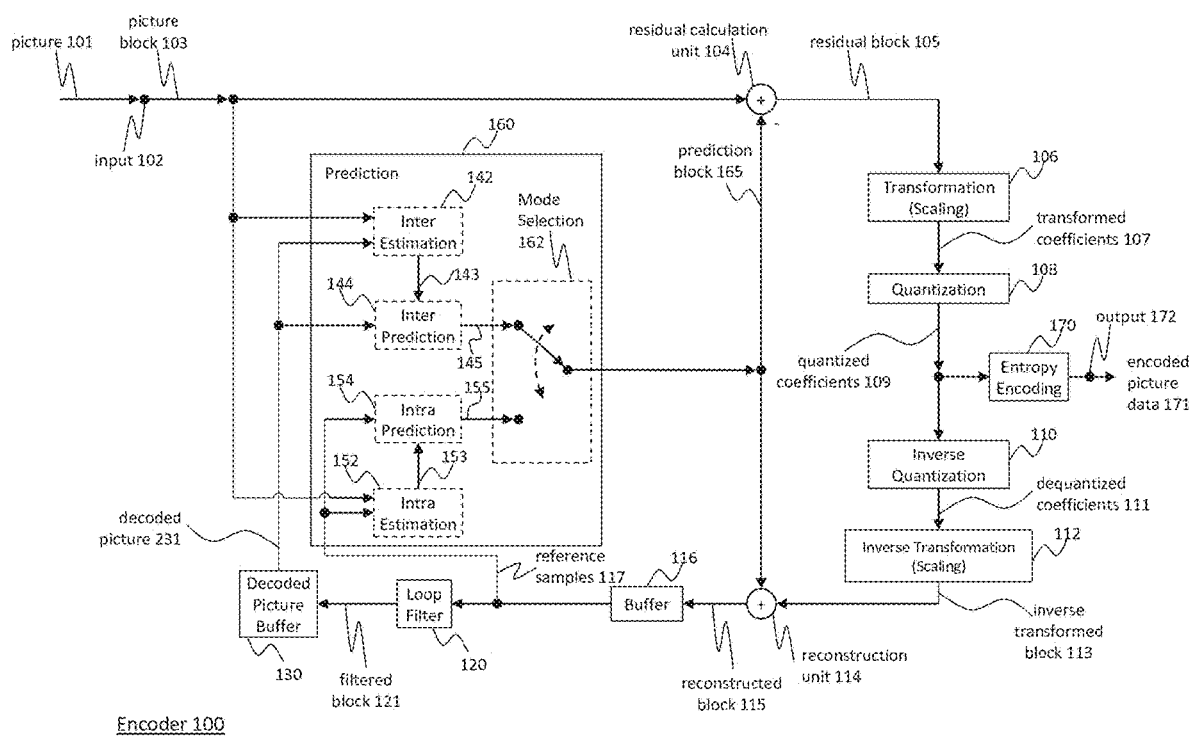
FIG. 1 is a block diagram showing an example structure of a video encoder configured to implement embodiments of the invention.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or video images or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following an encoder 100, a decoder 200 and a coding system 300 for implementing embodiments of the invention are described based on FIGS. 1 to 3, before describing the embodiments of the invention in more detail based on FIGS. 4 to 11.

Figure 3:
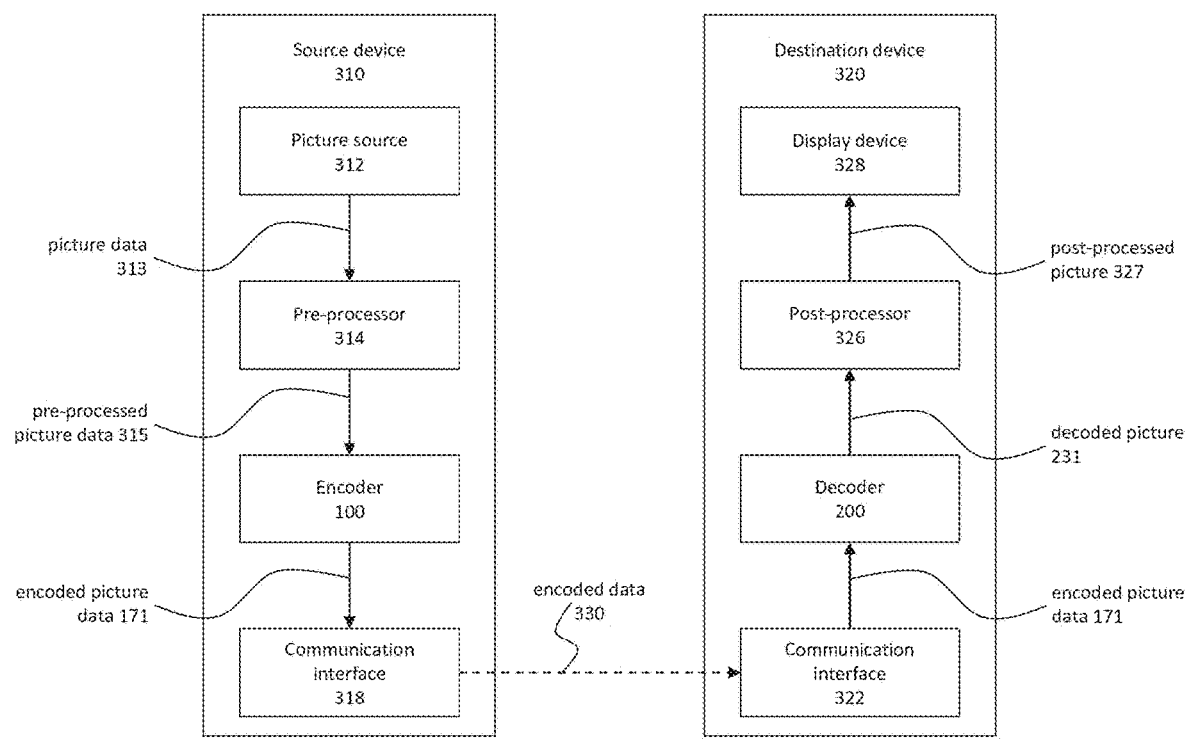
FIG. 3 is a block diagram showing an example of a video coding system configured to implement embodiments of the invention.

FIG. 3 is a conceptional or schematic block diagram illustrating an embodiment of a coding system 300, e.g., a picture coding system 300, wherein the coding system 300 comprises a source device 310 configured to provide encoded data 330, e.g., an encoded picture 330, e.g., to a destination device 320 for decoding the encoded data 330.

The source device 310 comprises an encoder 100 or encoding unit 100, and may additionally, i.e. optionally, comprise a picture source 312, a pre-processing unit 314, e.g., a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture). In the following, all these kinds of pictures and any other kind of picture will be referred to as "picture", unless specifically described otherwise, while the previous explanations with regard to the term "picture" covering "video pictures", "video images", "still images", and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g., from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g., the destination device 320 or any other device, for storage or direct reconstruction, or to process the encoded picture data 171 for respectively before storing the encoded data 330 and/or transmitting the encoded data 330 to another device, e.g., the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured to receive the encoded picture data 171 or the encoded data 330, e.g., directly from the source device 310 or from any other source, e.g., a memory, e.g., an encoded picture data memory.

The communication interface 318 and the communication interface 322 may be configured to transmit respectively receive the encoded picture data 171 or encoded data 330 via a direct communication link between the source device 310 and the destination device 320, e.g., a direct wired or wireless connection, or via any kind of network, e.g., a wired or wireless network or any combination thereof, or any kind of private and public network, or any kind of combination thereof.

The communication interface 318 may be, e.g., configured to package the encoded picture data 171 into an appropriate format, e.g., packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g., comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g., to send and receive messages, e.g., to set up a connection, to acknowledge and/or re-send lost or delayed data including picture data, and exchange any other information related to the communication link and/or data transmission, e.g., encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g., the decoded picture 231, to obtain post-processed picture data 327, e.g., a post-processed picture 327. The post-processing performed by the post-processing unit 326 may comprise, e.g., color format conversion (e.g., from YCbCr to RGB), color correction, trimming, or re-sampling, or any other processing, e.g., for preparing the decoded picture data 231 for display, e.g., by display device 328.

The display device 328 of the destination device 320 is configured to receive the post-processed picture data 327 for displaying the picture, e.g., to a user or viewer. The display device 328 may be or comprise any kind of display for representing the reconstructed picture, e.g., an integrated or external display or monitor. The displays may, e.g., comprise cathode ray tubes (CRT), liquid crystal displays (LCD), plasma displays, organic light emitting diodes (OLED) displays or any kind of other display, beamer, or hologram (3D).

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments of the invention and embodiments of the invention are not limited to those shown in FIG. 3.

Source device 310 and destination device 320 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices, broadcast receiver device, or the like, and may use no or any kind of operating system.

Encoder & Encoding Method

FIG. 1 shows a schematic/conceptual block diagram of an embodiment of an encoder 100, e.g., a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160 (including an inter estimation unit 142, an inter-prediction unit 144, an intra-estimation unit 152, and an intra-prediction unit 154) a mode selection unit 162, an entropy encoding unit 170, and an output 172. A video encoder 100 as shown in FIG. 1 may also be referred to as hybrid video encoder or a video encoder according to a hybrid video codec.

Figure 2:
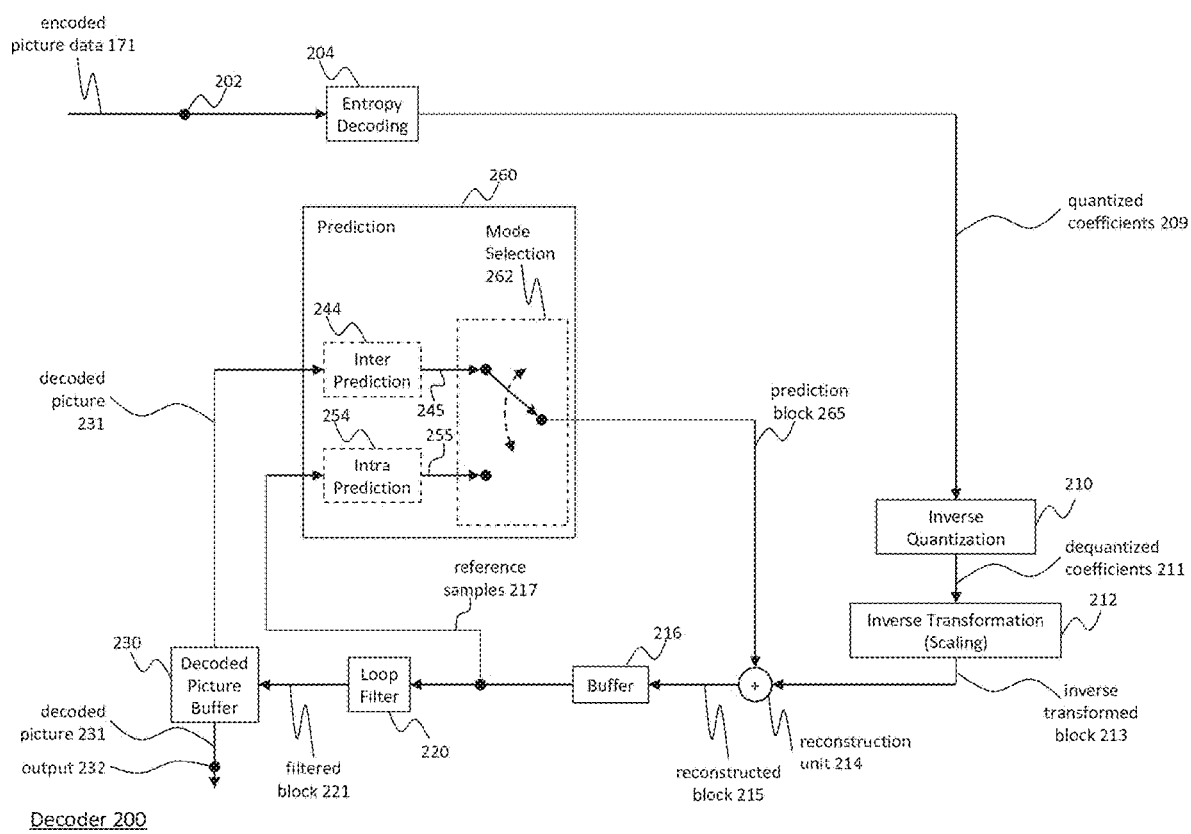
FIG. 2 is a block diagram showing an example structure of a video decoder configured to implement embodiments of the invention.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the decoded picture buffer (DPB) 130, the inter-prediction unit 144, and the intra-prediction unit 154 form a backward signal path of the encoder, wherein the backward signal path of the encoder corresponds to the signal path of the decoder (see decoder 200 in FIG. 2).

The encoder 100 is configured to receive, e.g., by input 102, a picture 101 or a picture block 103 of the picture 101, e.g., picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g., previously encoded and/or decoded pictures of the same video sequence, i.e. the video sequence which also comprises the current picture).

Residual Calculation

The residual calculation unit 104 is configured to calculate a residual block 105 based on the picture block 103 and a prediction block 165 (further details about the prediction block 165 are provided later), e.g., by subtracting sample values of the prediction block 165 from sample values of the picture block 103, sample by sample (pixel by pixel) to obtain the residual block 105 in the sample domain.

Transformation

The transformation unit 106 is configured to apply a transformation, e.g., a spatial frequency transform or a linear spatial (frequency) transform, e.g., a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, trade-off between accuracy and implementation costs, etc. Specific scaling factors are, for example, specified for the inverse transform, e.g., by inverse transformation unit 212, at a decoder 200 (and the corresponding inverse transform, e.g., by inverse transformation unit 112 at an encoder 100) and corresponding scaling factors for the forward transform, e.g., by transformation unit 106, at an encoder 100 may be specified accordingly.

Quantization

The quantization unit 108 is configured to quantize the transformed coefficients 107 to obtain quantized coefficients 109, e.g., by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding inverse dequantization, e.g., by inverse quantization 110, may include multiplication by the quantization step size. Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the encoder 100 (or respectively of the quantization unit 108) may be configured to output the quantization scheme and quantization step size, e.g., by means of the corresponding quantization parameter, so that a decoder 200 may receive and apply the corresponding inverse quantization. Embodiments of the encoder 100 (or quantization unit 108) may be configured to output the quantization scheme and quantization step size, e.g., directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 11, e.g., by applying the inverse of the quantization scheme applied by the quantization unit 108 based on or using the same quantization step size as the quantization unit 108. The dequantized coefficients 11 may also be referred to as dequantized residual coefficients 11 and correspond—although typically not identical to the transformed coefficients due to the loss by quantization—to the transformed coefficients 108.

The inverse transformation unit 112 is configured to apply the inverse transformation of the transformation applied by the transformation unit 106, e.g., an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g., by sample-wise adding the sample values of the decoded residual block 113 and the sample values of the prediction block 165.

The buffer unit 116 (or short "buffer" 116), e.g., a line buffer 116, is configured to buffer or store the reconstructed block and the respective sample values, for example for intra-estimation and/or intra-prediction. In further embodiments, the encoder may be configured to use unfiltered reconstructed blocks and/or the respective sample values stored in buffer unit 116 for any kind of estimation and/or prediction.

The loop filter unit 120 (or short "loop filter" 120), is configured to filter the reconstructed block 115 to obtain a filtered block 121, e.g., by applying a de-blocking sample-adaptive offset (SAO) filter or other filters, e.g., sharpening or smoothing filters or collaborative filters. The filtered block 121 may also be referred to as filtered reconstructed block 121.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 1) one or a plurality of filters (loop filter components/subfilters), e.g., one or more of different kinds or types of filters, e.g., connected in series or in parallel or in any combination thereof, wherein each of the filters may comprise individually or jointly with other filters of the plurality of filters a filter analysis unit to determine the respective loop filter parameters, e.g., as described in the previous paragraph.

Embodiments of the encoder 100 (respectively loop filter unit 120) may be configured to output the loop filter parameters, e.g., directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g., previously reconstructed and filtered blocks 121, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter-estimation and/or inter-prediction.

Further embodiments of the invention may also be configured to use the previously filtered blocks and corresponding filtered sample values of the decoded picture buffer 130 for any kind of estimation or prediction, e.g., intra- and inter-estimation and prediction.

Motion Estimation and Prediction

The prediction unit 160, also referred to as block prediction unit 160, is configured to receive or obtain the picture block 103 (current picture block 103 of the current picture 101) and decoded or at least reconstructed picture data, e.g., reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g., an intra- or inter-prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g., from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g., prediction unit 160) and mode selection (e.g., by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g., non-directional modes like DC (or mean) mode and planar mode, or directional modes, e.g., as defined in H.264, or may comprise 65 different intra-prediction modes, e.g., non-directional modes like DC (or mean) mode and planar mode, or directional modes, e.g., as defined in H.265.

The set of (or possible) inter-prediction modes depend on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

In addition to the above prediction modes, skip mode and/or direct mode may be applied.

The prediction unit 160 may be further configured to partition the block 103 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 103 and the prediction modes applied to each of the block partitions or sub-blocks.

The inter-estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g., reconstructed blocks of one or a plurality of other/different previously decoded pictures 231, for inter-estimation (or "inter picture estimation"). E.g., a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter-estimation parameters 143 to the inter-prediction unit 144. This offset is also called motion vector (MV). The inter-estimation is also referred to as motion estimation (ME) and the inter-prediction also motion prediction (MP).

The inter-prediction unit 144 is configured to obtain, e.g., receive, an inter-prediction parameter 143 and to perform inter-prediction based on or using the inter-prediction parameter 143 to obtain an inter-prediction block 145.

Although FIG. 1 shows two distinct units (or steps) for the inter-coding, namely inter estimation 142 and inter-prediction 152, both functionalities may be performed as one (inter estimation typically comprises calculating an/the inter-prediction block, i.e. the or a "kind of" inter-prediction 152), e.g., by testing all possible or a predetermined subset of possible interprediction modes iteratively while storing the currently best inter-prediction mode and respective inter-prediction block, and using the currently best inter-prediction mode and respective inter-prediction block as the (final) inter-prediction parameter 143 and inter-prediction block 145 without performing another time the inter-prediction 144.

The intra-estimation unit 152 is configured to obtain, e.g., receive, the picture block 103 (current picture block) and one or a plurality of previously reconstructed blocks, e.g., reconstructed neighbor blocks, of the same picture for intra-estimation. The encoder 100 may, e.g., be configured to select an intra-prediction mode from a plurality of intra-prediction modes and provide it as intra-estimation parameter 153 to the intra-prediction unit 154.

Embodiments of the encoder 100 may be configured to select the intra-prediction mode based on an optimization criterion, e.g., minimum residual (e.g., the intra-prediction mode providing the prediction block 155 most similar to the current picture block 103) or minimum rate distortion.

The intra-prediction unit 154 is configured to determine based on the intra-prediction parameter 153, e.g., the selected intra-prediction mode 153, the intra-prediction block 155.

Although FIG. 1 shows two distinct units (or steps) for the intra-coding, namely intra-estimation 152 and intra-prediction 154, both functionalities may be performed as one (intra-estimation typically comprises calculating the intra-prediction block, i.e. the or a "kind of" intra-prediction 154), e.g., by testing all possible or a predetermined subset of possible intra-prediction modes iteratively while storing the currently best intra-prediction mode and respective intra-prediction block, and using the currently best intra-prediction mode and respective intra-prediction block as the (final) intra-prediction parameter 153 and intra-prediction block 155 without performing another time the intra-prediction 154.

The invention, as explained further below with respect to the device 500 (FIG. 5) and method 700 (FIG. 7) according to embodiments of the invention may be applied at this position of the encoder 100. That is, the device 500 may be or be part of the encoder 100, specifically the intra-prediction unit 154.

The entropy encoding unit 170 is configured to apply an entropy encoding algorithm or scheme (e.g., a variable length coding (VLC) scheme, an context adaptive VLC scheme (CALVC), an arithmetic coding scheme, a context adaptive binary arithmetic coding (CABAC) on the quantized residual coefficients 109, inter-prediction parameters 143, intra-prediction parameter 153, and/or loop filter parameters, individually or jointly (or not at all) to obtain encoded picture data 171 which can be output by the output 172, e.g., in the form of an encoded bitstream 171.

FIG. 2 shows an exemplary video decoder 200 configured to receive encoded picture data (e.g., encoded bitstream) 171, e.g., encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260 (including an inter-prediction unit 244, and an intra-prediction unit 254), a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g., (decoded) any or all of inter-prediction parameters 143, intra-prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g., from entropy decoding unit 204), and the decoded picture buffer 230 may be identical in function to the decoded picture buffer 130.

The prediction unit 260 may comprise an inter-prediction unit 244 and an intra-prediction unit 254, wherein the inter-prediction unit 144 may be identical in function to the inter-prediction unit 244, and the intra-prediction unit 154 may be identical in function to the intra-prediction unit 254. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g., from the entropy decoding unit 204.

The invention, as explained further below with respect to the device 500 (see FIG. 5) and method 700 (see FIG. 7) according to embodiments of the invention may be applied at this position of the decoder 200. That is, the device 500 may be or be part of the decoder 200, specifically the intra-prediction unit 154.

The decoder 200 is configured to output the decoded picture 230, e.g., via output 232, for presentation or viewing to a user.

Figure 4:
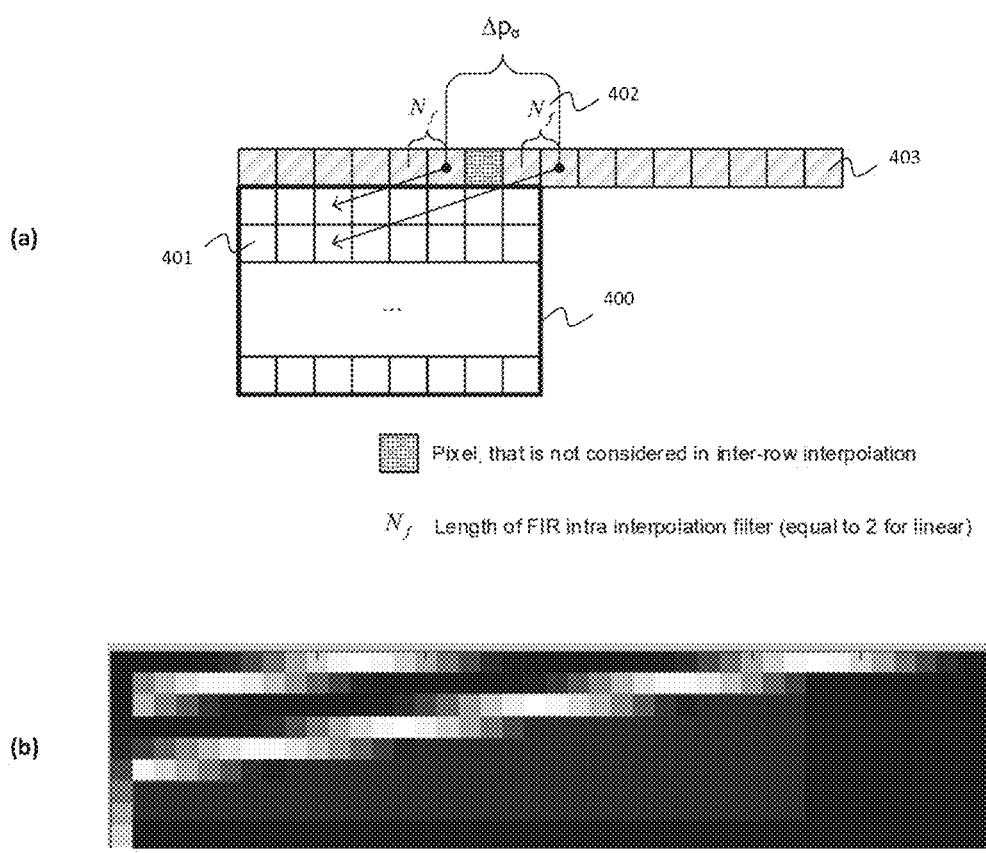
FIG. 4 shows (a) a source of discontinuities for a case when intra-prediction angles are smaller than 45°, and (b) inter-row discontinuities for the case when intra-prediction angles are smaller than 45°.
Figure 14:
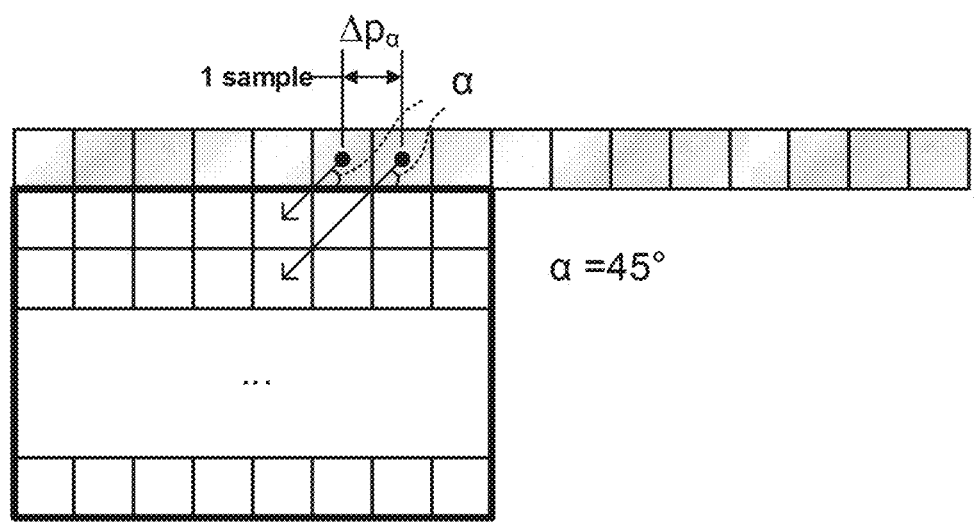
FIG. 14 shows schematically a distance between reference samples for intra-predicting two adjacent rows of prediction samples for intra-prediction angles equal to 45°.
Figure 15:
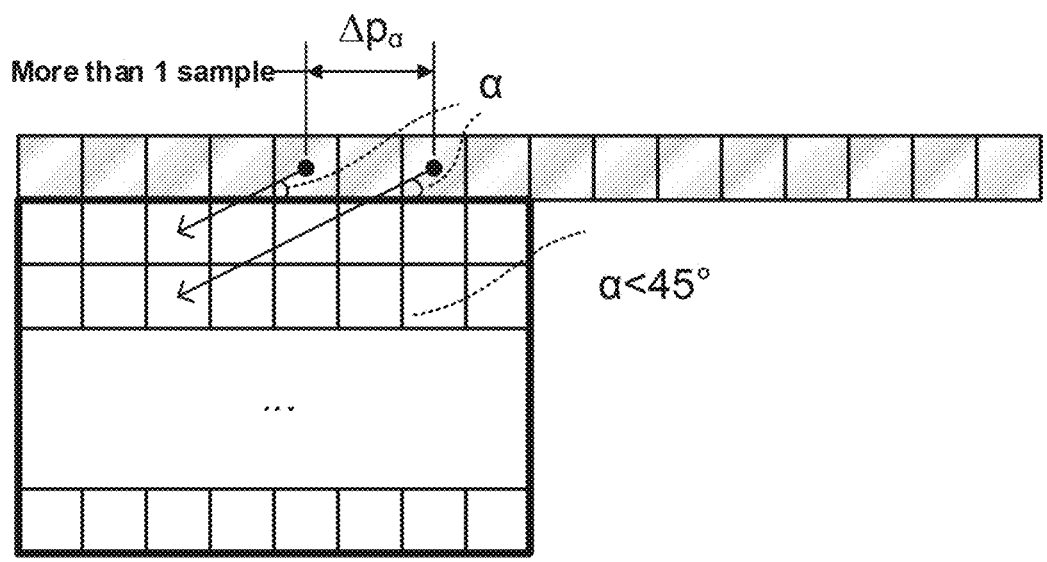
FIG. 15 shows schematically a distance between reference samples for intra-prediction two adjacent rows of prediction samples for intra-prediction angles smaller than 45°.

With reference to FIGS. 14 and 15, FIG. 4 illustrates more specifically in (a) the source of discontinuities that can be removed by the embodiments of the invention. In particular, the reason for these discontinuities is that two vertically adjacent prediction samples 401 in a prediction block 400 (e.g., PU or TU) may be predicted from reference samples 403 that are not adjacent to each other due to an acute intra-prediction angle, which is an interpolation flaw. While this flaw may partially be reduced by applying a reference samples smoothing filter or an intra-interpolation filter with a length $N_f$, a fixed length may not be large enough in the case of an intra-prediction angle of significantly less than 45°. The filtering process can reduces discontinuity effects by convoluting the reference samples 403 shown in FIG. 4 during the filtering process. However, discontinuities may still occur, if the reference samples 403 selected for the vertically adjacent prediction samples 401 are too far apart. An example of such discontinuities, which can be visually observed e.g., for the case of synthesized reference (the upper row), is shown in (b).

Figure 5:
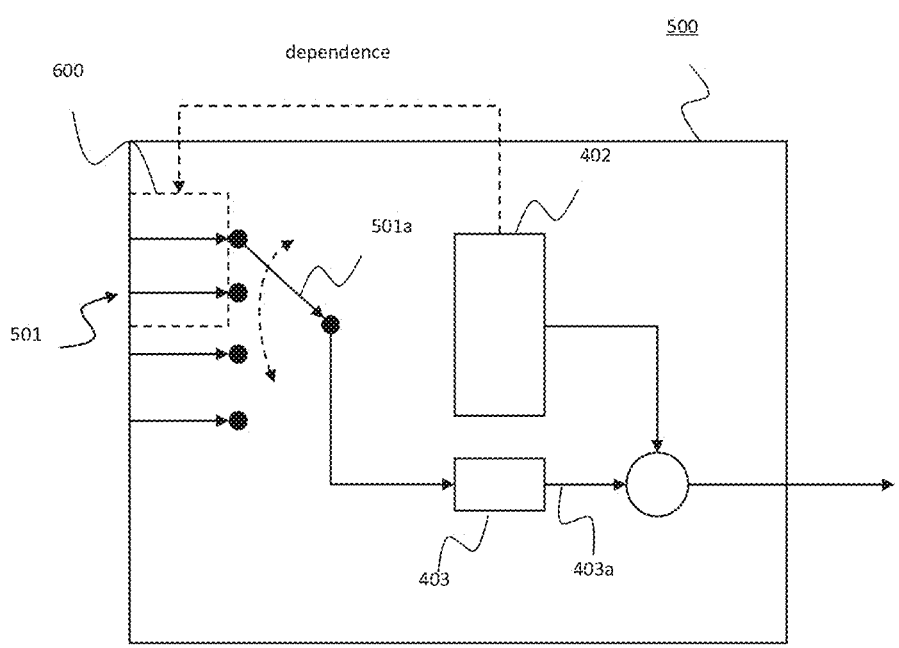
FIG. 5 is a block diagram showing a device according to an embodiment of the invention.

FIG. 5 shows schematically a device 500 according to an embodiment of the invention, which is configured to intra-predict a prediction block 400 of a video image in an improved manner. Namely, the device 500 does thereby not suffer from the above-described source of the discontinuities shown in FIG. 4. The device 500 may be or be part of the encoder 100 or decoder 200 shown in FIG. 1 or FIG. 2, respectively, specifically the intra-prediction units 154 or 254.

The device 500 is configured to perform several functions, which may, for instance, be implemented by means of a processor or other kind of processing circuitry. Specifically, the device 500 is configured to select a directional intra-prediction mode 501a from a set of directional intra-prediction modes 501, wherein each directional intra-prediction mode 501 corresponds to a different intra-prediction angle. These directional intra-prediction modes 501 may include the directional/angular intra-prediction modes shown in FIG. 8 (and as defined in the standard). The intra-prediction angle bases on the direction of intra-predicting a prediction sample 401 from a reference sample 403. For instance, the angle may be defined between this intra-prediction direction and an upper edge (horizontal edge) of the prediction block 400.

The device 500 is further configured to determine, for a given prediction sample 401 of the prediction block 400, a reference sample 403a from a set of reference samples 403 based on the selected directional intra-prediction mode 501a, and apply a filter 402 to the determined reference sample 403a. The filter 402 may be a filter with a certain pre-selected filter length. The filter length may, for instance, be pre-selected based on the aspect ratio, width, and/or height of the prediction block 400. The device 500 may be configured to proceed in the above-described way for each prediction sample 401 of the prediction block 400. That is, for each prediction sample 401, the device 500 may determine a reference sample 403a from the reference samples 403, and may apply the filter 402 to each determined reference sample 403. Thereby, the device 500 is able to intra-predict the entire prediction block 400.

Figure 13:
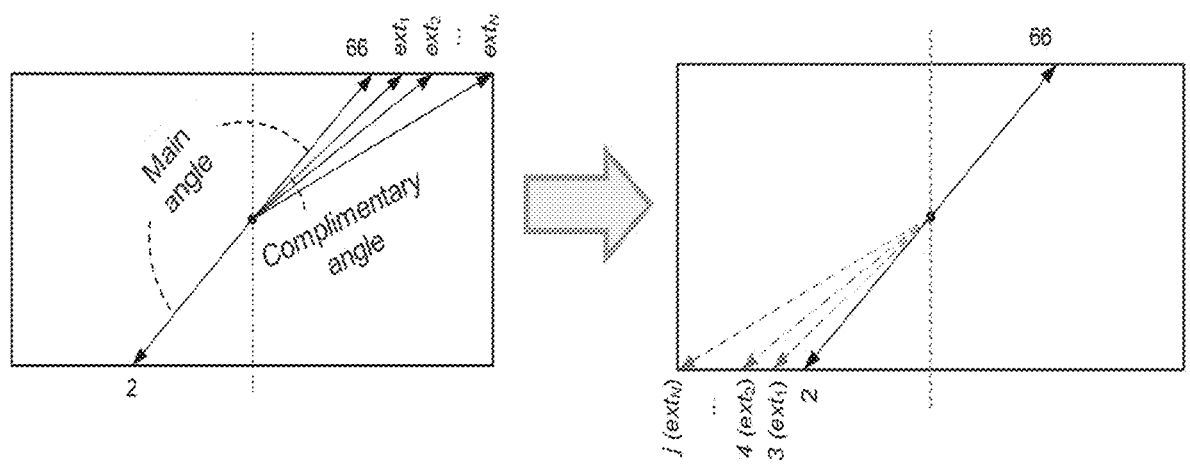
FIG. 13 shows a proposed extension of directional intra-prediction modes.

In the device 500, within at least a subset 600 (see better FIG. 6) of the directional intra-prediction modes 501, an angular step 601 (see better FIG. 6) between the directional intra-prediction modes 501 is defined in dependence of a filter length of the filter 402. The subset 600 may include "extended" directional intra-prediction modes 501, i.e. directional intra-prediction modes added to those shown in FIG. 8, e.g., as illustrated in FIG. 13. In particular, for a rectangular prediction block 400, the directional intra-prediction modes 501 in the subset 600 may include modes 501 that relate to acute intra-prediction angles (angles smaller than 45°). The number of directional intra-prediction modes 501 in the subset 600 may be selected based on an aspect ratio, height, and/or width of the prediction block 400, and is assumed to be given for a certain prediction block 400. Each directional intra-prediction mode 501 in the subset 600 may be provided with an index to be signaled (like the indices of the other modes 501).

Figure 6:
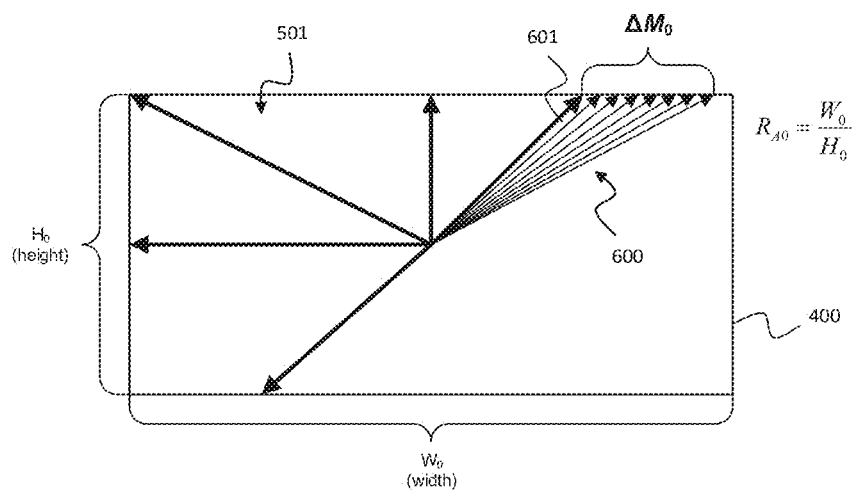
FIG. 6 shows the concept of using different angular steps for extended directional intra-prediction modes.

FIG. 6 shows exemplarily multiple directional intra-prediction modes 501 in the set, and specifically shows directional intra-prediction modes in the subset 600 contained in the set. The subset 600 of directional intra-prediction modes 501 is defined by $\Delta M_o$, wherein $\Delta M_0$ denotes the number of directional intra-prediction modes 501 in the subset 600. The intra-prediction angles associated with the modes 501 in the subset 600 span an angular range that depends on the angular step 601 (between angles of neighboring directional intra-prediction modes 501). The angular step 601 is defined in accordance with the reference sample filter 402 length. The idea here is to prevent the occurrence of situations shown in FIG. 4 by decreasing the angular step 601 within the subset 600, and thus the overall angular range spanned by the subset 600, for smaller filter length. The angular step 601 between angles associated with directional intra-prediction modes 501 in the subset 600 may notably differ, particularly may be larger or smaller, than an angular step between angles associated with directional intra-prediction modes 501 not in the subset 600 (but still in the set of modes 501).

Specifically, the angular step 601 in the subset 600 may be specified as follows:

$$\Delta\alpha = \frac{\arctan N_f}{\Delta M_0}$$

wherein $\Delta\alpha$ is the angular step 601, $N_f$ denotes the length of the filter 402 (implying intra-interpolation filter). The subset 600, i.e. the number of modes 501 in the subset 600, may specifically be defined according to e.g., an aspect ratio $$R_{A_0} = \frac{W_0}{H_0}$$

of the prediction block 400. Also the filter length of the filter 402 may be selected in dependence of the aspect ratio of the prediction block 400 or may be selected in dependence of a height and/or a width of the prediction block 400. Notably, the last directional intra-prediction mode 501 in the subset 600 will be associated with an intra-prediction angle calculated by $\Delta\alpha \cdot \Delta M_0$, and does not necessary fall to the top-right corner (as it is shown in FIG. 6).

Below table shows exemplary angular steps 601 that may be applied between the angles associated with the directional intra-prediction modes 501 in the subset 600. As can be seen in the table, the angular step 601 may be between 2-4 degrees, particularly it may be 2, 2.5, 3 or 4 degrees, depending on the filter length of the filter 402. The filter length of the filter 402 may span 1-7 adjacent reference samples 403, particularly it may span 1, 3, 5 or 7 adjacent reference samples 403.

| | Length of reference sample filter | | | |
|---|---|---|---|---|
| | 1 | 3 | 5 | 7 |
| Angular step (degrees) | 2 | 2.5 | 3 | 4 |

It can be seen that the more taps the filters 402 have (i.e. larger filter length in terms of reference samples 403), the larger the angular step 601 that is used for the directional intra-prediction modes 501 in the subset 600. A main difference to current implementations and proposals is notably that the intra-prediction directions of the directional intra-prediction modes 501 in the subset 600 do not necessarily correspond to opposite intra-prediction directions of other modes 501 in the set, but depend only the selected filter 402, i.e. its filter length.

Figure 7:
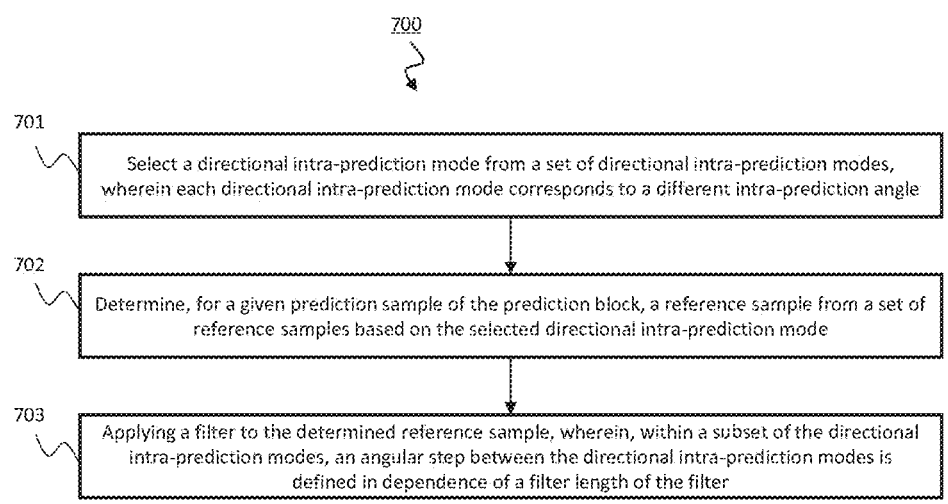
FIG. 7 shows a flow-diagram of a method according to an embodiment of the invention.
Figure 8:
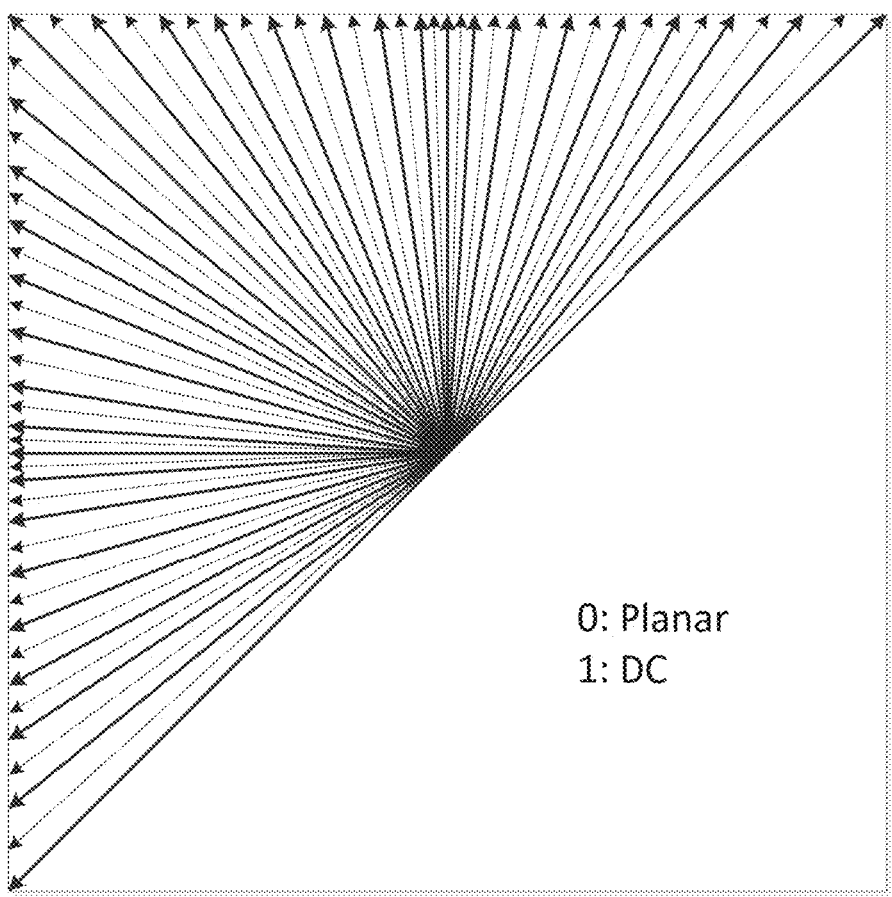
FIG. 8 shows intra-prediction modes in the HM and JEM software (the angular/directional modes are marked by dashed lines are introduced just for JEM but not for HM).
Figure 9:
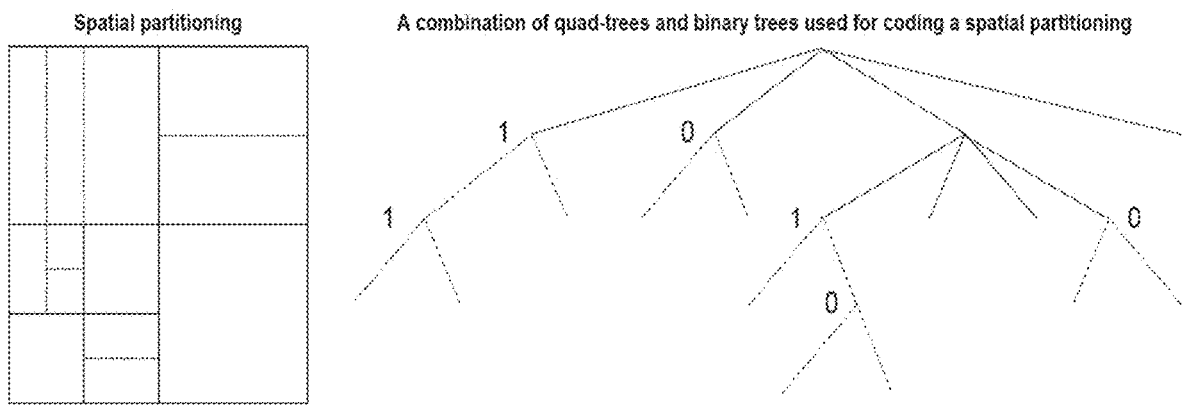
FIG. 9 shows schematically a QTBT partitioning.
Figure 10:
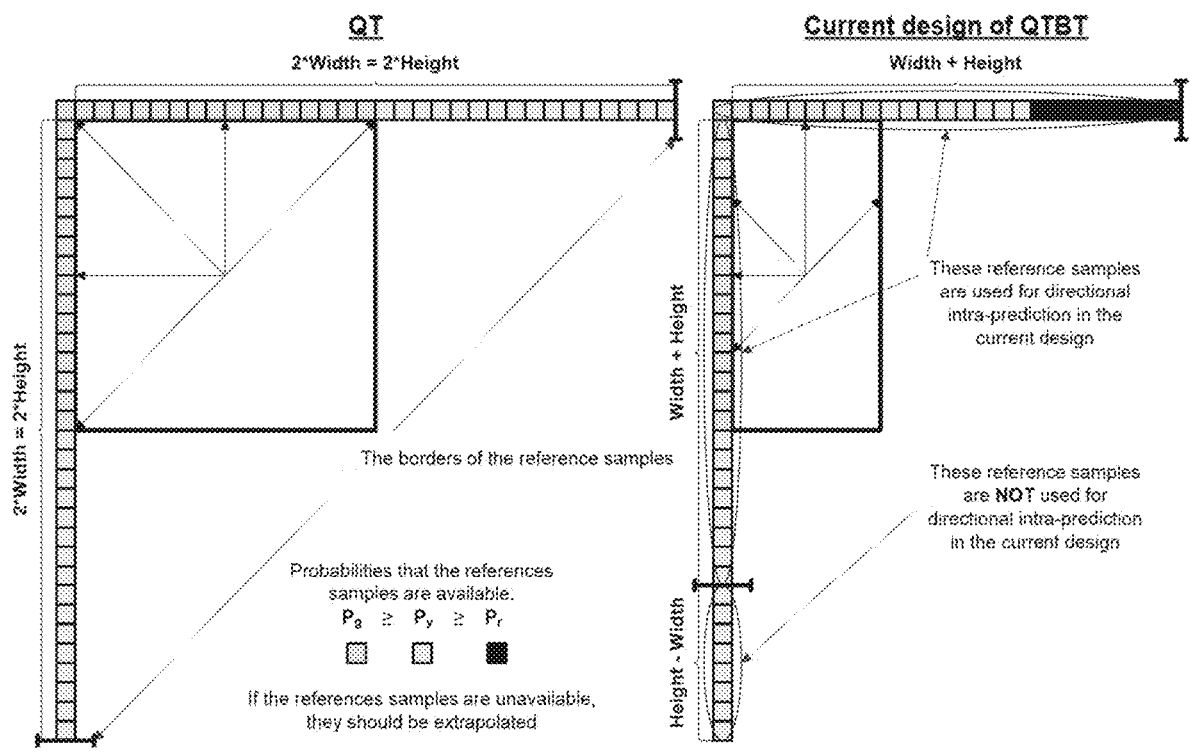
FIG. 10 shows a current implementation of a directional intra-prediction mechanism in the QT and QTBT frameworks.
Figure 11:
FIG. 11 explains an orientation of rectangular blocks, particularly shows a rectangular block with (a) a horizontal orientation and (b) a vertical orientation.
Figure 11:
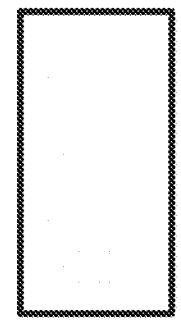
Figure 12:
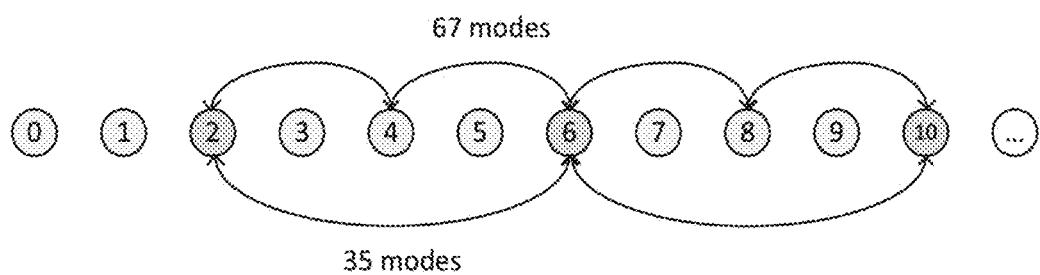
FIG. 12 shows intra-mode selection proposed in JVET-D0113.

FIG. 7 shows a method 700 according to an embodiment of the invention. The method 700 is for intra-predicting a prediction block 400 of a video image, and may be carried out by the device 500 shown in FIG. 5. In particular, the method 700 comprises a step 701 of selecting a directional intra-prediction mode 501a from a set of directional intra-prediction modes 501, wherein each directional intra-prediction mode 501 corresponds to a different intra-prediction angle. Further, the method 700 comprises a step 701 of determining, for a given prediction sample 401 of the prediction block 400, a reference sample 403a from a set of reference samples 403 based on the selected directional intra-prediction mode 501a, and applying a filter 402 to the determined reference sample 403a. In the method 700, within a subset 600 of the directional intra-prediction modes 501, an angular step 601 between the directional intra-prediction modes 501 is defined in dependence of a filter length of the filter 402.

Note that this specification provides explanations for pictures (frames), but fields substitute as pictures in the case of an interlace picture signal.

Although embodiments of the invention have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g., partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Embodiments of the invention may further comprise an apparatus, e.g., encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g., a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment of the invention comprises or is a computer program comprising program code for performing any of the methods described herein, when executed on a computer.

An embodiment of the invention comprises or is a computer readable medium comprising a program code that, when executed by a processor, causes a computer system to perform any of the methods described herein.

LIST OF REFERENCE SIGNS

FIG. 1
100 Encoder
103 Picture block
102 Input (e.g., input port, input interface)
104 Residual calculation [unit or step]
105 Residual block
106 Transformation (e.g., additionally comprising scaling) [unit or step]
107 Transformed coefficients
108 Quantization [unit or step]
109 Quantized coefficients
110 Inverse quantization [unit or step]
111 De-quantized coefficients
112 Inverse transformation (e.g., additionally comprising scaling) [unit or step]
113 Inverse transformed block
114 Reconstruction [unit or step]
115 Reconstructed block
116 (Line) buffer [unit or step]
117 Reference samples
120 Loop filter [unit or step]
121 Filtered block
130 Decoded picture buffer (DPB) [unit or step]
142 Inter estimation (or inter picture estimation) [unit or step]
143 Inter estimation parameters (e.g., reference picture/reference picture index, motion vector/offset)
144 Inter prediction (or inter picture prediction) [unit or step]
145 Inter prediction block
152 Intra estimation (or intra picture estimation) [unit or step]
153 Intra prediction parameters (e.g., intra prediction mode)
154 Intra prediction (intra frame/picture prediction) [unit or step]

155 Intra prediction block
162 Mode selection [unit or step]
165 Prediction block (either inter prediction block 145 or intra prediction block 155)
170 Entropy encoding [unit or step]
171 Encoded picture data (e.g., bitstream)
172 Output (output port, output interface)
231 Decoded picture
FIG. 2
200 Decoder
171 Encoded picture data (e.g., bitstream)
202 Input (port/interface)
204 Entropy decoding
209 Quantized coefficients
210 Inverse quantization
211 De-quantized coefficients
212 Inverse transformation (scaling)
213 Inverse transformed block
214 Reconstruction (unit)
215 Reconstructed block
216 (Line) buffer
217 Reference samples
220 Loop filter (in loop filter)
221 Filtered block
230 Decoded picture buffer (DPB)
231 Decoded picture
232 Output (port/interface)
244 Inter prediction (inter frame/picture prediction)
245 Inter prediction block
254 Intra prediction (intra frame/picture prediction)
255 Intra prediction block
260 Mode selection
265 Prediction block (inter prediction block 245 or intra prediction block 255)
FIG. 3
300 Coding system
310 Source device
312 Picture Source
313 (Raw) picture data
314 Pre-processor/Pre-processing unit
315 Pre-processed picture data
318 Communication unit/interface
320 Destination device
322 Communication unit/interface
326 Post-processor/Post-processing unit
327 Post-processed picture data
328 Display device/unit
330 transmitted/received/communicated (encoded) picture data
FIG. 4
400 Prediction block
401 Prediction sample
402 Filter
403 Reference Sample
FIG. 5
402 Filter
403 Reference sample
403a Determined reference sample
500 Device
501 Directional intra-prediction modes
501a Selected directional intra-prediction mode
600 Subset of directional intra-prediction modes
FIG. 6
400 Prediction block
501 Directional intra-prediction modes
600 Subset of directional intra-prediction modes
601 Angular step between intra-prediction angles in subset FIG. 7
700 Method for intra-predicting a prediction block
701 Step of selecting an intra-prediction mode
702 Step of determining a reference sample for a given prediction sample
703 Step of applying a filter to the determined reference sample

What is claimed is:

1. A device, comprising:
a non-transitory computer-readable storage medium storing instructions; and
one or more processors in communication with the medium and upon execution of the instructions, configured to:
select a directional intra-prediction mode from a set of directional intra-prediction modes, wherein each directional intra-prediction mode of the set of directional intra-prediction modes corresponds to a different intra-prediction angle;
determine, for a prediction sample of a prediction block, a reference sample from a set of reference samples based on the selected directional intra-prediction mode; and
apply a filter to the determined reference sample, wherein, within a subset of directional intra-prediction modes of the set of directional intra-prediction modes, an angular step between the directional intra-prediction modes is defined in dependence of a filter length of the filter.

2. The device according to claim 1, wherein the angular step is larger for a larger filter length of the filter and smaller for a smaller filter length of the filter.

3. The device according to claim 1, wherein the angular step is in a range of 2 to 4 degrees.

4. The device according to claim 1, wherein the filter length of the filter spans 1 to 7 adjacent reference samples.

5. The device according to claim 1, wherein the angular step is denoted $\Delta\alpha$ and is defined by $$\Delta\alpha = \frac{\arctan N_f}{\Delta M_0}$$

wherein $N_f$ is the filter length of the filter and $\Delta M_0$ is a number of directional intra-prediction modes in the subset.

6. The device according to claim 1, wherein the filter length of the filter is selected in dependence of an aspect ratio of the prediction block.

7. The device according to claim 1, wherein the filter length of the filter is selected in dependence of a height or a width of the prediction block.

8. The device according to claim 1, wherein the filter performs a smoothing over the determined reference sample and one or more adjacent reference samples according to the filter length, when applied to the determined reference sample.

9. The device according to claim 1, wherein reference samples of the set of reference samples are arranged in a row of a video image adjacently above and above-right the prediction block, or are arranged in a column of the video image adjacently left and left-under the prediction block.

10. The device according to claim 1, wherein:
the device is configured for encoding or decoding a video image; or
the device is a video encoder or a video decoder.

11. A method, comprising:
- selecting a directional intra-prediction mode from a set of directional intra-prediction modes, wherein each directional intra-prediction mode of the set of directional intra-prediction modes corresponds to a different intra-prediction angle;
- determining, for a prediction sample of a prediction block, a reference sample from a set of reference samples based on the selected directional intra-prediction mode; and
- applying a filter to the determined reference sample, wherein, within a subset of directional intra-prediction modes of the set of directional intra-prediction modes, an angular step between the directional intra-prediction modes is defined in dependence of a filter length of the filter.

12. The method according to claim 11, wherein the angular step is larger for a larger filter length of the filter and smaller for a smaller filter length of the filter.

13. The method according to claim 11, wherein the angular step is in a range of 2 to 4 degrees.

14. The method according to claim 11, wherein the filter length of the filter spans 1 to 7 adjacent reference samples.

15. The method according to claim 11, wherein the angular step is denoted $\Delta\alpha$ and is defined by $$\Delta\alpha = \frac{\arctan N_f}{\Delta M_0}$$

wherein $N_f$ is the filter length of the filter and $\Delta M_0$ is the number of directional intra-prediction modes in the subset.

16. The method according to claim 11, wherein the filter length of the filter is selected in dependence of an aspect ratio of the prediction block.

17. The method according to claim 11, wherein the filter length of the filter is selected in dependence of a height or a width of the prediction block.

18. The method according to claim 11, wherein the filter performs a smoothing over the determined reference sample and one or more adjacent reference samples according to the filter length, when applied to the determined reference sample.

19. The method according to claim 11, wherein reference samples of the set of reference samples are arranged in a row of a video image adjacently above and above-right the prediction block, or are arranged in a column of the video image adjacently left and left-under the prediction block.

20. A non-transitory storage medium storing a bitstream, wherein the bitstream is encoded or decoded by executing a program stored in the non-transitory storage medium to:
- select a directional intra-prediction mode from a set of directional intra-prediction modes, wherein each directional intra-prediction mode of the set of directional intra-prediction modes corresponds to a different intra-prediction angle;
- determine, for a prediction sample of a prediction block, a reference sample from a set of reference samples based on the selected directional intra-prediction mode; and
- apply a filter to the determined reference sample, wherein, within a subset of directional intra-prediction modes of the set of directional intra-prediction modes, an angular step between the directional intra-prediction modes is defined in dependence of a filter length of the filter.

* * * * *